United States Patent
Horie

(10) Patent No.: US 8,427,560 B2
(45) Date of Patent: Apr. 23, 2013

(54) IMAGE PROCESSING DEVICE

(75) Inventor: Gen Horie, Hachioji (JP)

(73) Assignee: Olympus Corporation, Tokyo (JP)

( * ) Notice: Subject to any disclaimer, the term of this patent is extended or adjusted under 35 U.S.C. 154(b) by 116 days.

(21) Appl. No.: 13/012,994

(22) Filed: Jan. 25, 2011

(65) Prior Publication Data
US 2011/0181760 A1 Jul. 28, 2011

(30) Foreign Application Priority Data

Jan. 25, 2010 (JP) .................................. 2010-013370

(51) Int. Cl.
*H04N 9/64* (2006.01)
(52) U.S. Cl.
USPC ..................... 348/242; 382/163; 348/222.1
(58) Field of Classification Search .................. 348/242; 382/163
See application file for complete search history.

(56) References Cited

U.S. PATENT DOCUMENTS

| | | | |
|---|---|---|---|
| 7,200,279 B1* | 4/2007 | Lin | 382/274 |
| 7,450,166 B2* | 11/2008 | Jo et al. | 348/242 |
| 2003/0067548 A1* | 4/2003 | Sugimori | 348/273 |
| 2005/0052546 A1* | 3/2005 | Nakabayashi et al. | 348/223.1 |
| 2006/0262196 A1 | 11/2006 | Hasegawa et al. | |
| 2007/0139538 A1* | 6/2007 | Song et al. | 348/242 |
| 2009/0102951 A1* | 4/2009 | Ikeda | 348/242 |
| 2010/0231759 A1* | 9/2010 | Tsutsumi et al. | 348/242 |

FOREIGN PATENT DOCUMENTS

| | | |
|---|---|---|
| JP | 2003-224859 A | 8/2003 |
| JP | 3633561 | 1/2005 |

OTHER PUBLICATIONS

European Search Report dated Oct. 25, 2011 from corresponding European Patent Application Publication No. EP 11 00 0432.2.
Abstract of Japanese Patent Publication No. 2003-224859, dated Aug. 8, 2003.
European Office Action from related application EP 11 000 432.2-2202 dated Jan. 29, 2013.

* cited by examiner

*Primary Examiner* — Tuan Ho
*Assistant Examiner* — Zhenzhen Wu
(74) *Attorney, Agent, or Firm* — Scully, Scott, Murphy & Presser, P.C.

(57) ABSTRACT

An image capturing element of an image capturing section 2 has a color filter with a Bayer matrix, and interpolation unit 6 implements an interpolation process to an image signal for each pixel received from the image capturing element by using image signals of adjacent pixels to obtain an image signal of R, G and B for the respective pixels. High-frequency component extracting unit 7 extracts a high frequency component from the G signal; false-color reduced color signal generation unit 8 obtains, for the respective pixels, a false-color reduced color signal (R+B−2G) in which an effect of a false color is reduced; and, chroma signal generation unit 9 generates a chroma signal, which is an absolute value of the false-color reduced color signal. Suppression unit 10 suppresses the false color on the basis of the high frequency component extracted by the high-frequency component extracting unit 7 and the chroma signal for the respective pixels generated by the chroma signal generation unit 9.

8 Claims, 11 Drawing Sheets

FIG. 2

| R | G | R | G |
|---|---|---|---|
| G | B | G | B |
| R | G | R | G |
| G | B | G | B |

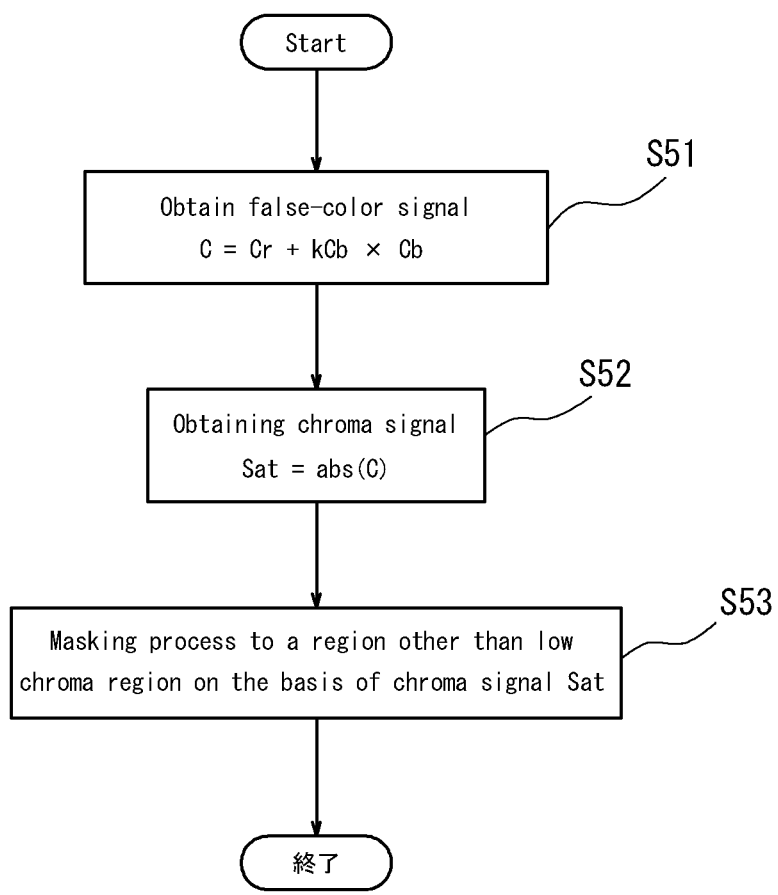

IMAGE PROCESSING DEVICE

CROSS-REFERENCE TO RELATED APPLICATION

The present application claims priority from Japanese Application No. 2010-013370, filed on Jan. 25, 2010, the content of which is incorporated herein by reference.

TECHNICAL FIELD

The present invention relates to an image processing device for use in a digital camera, microscope or the like.

BACKGROUND OF THE INVENTION

Conventionally, a CCD (charge coupled device) has been widely used as an image capturing element for a digital camera or video camera. The CCD has a structure in which a large number of photoelectric conversion elements are arranged, for example, in a grid pattern. When receiving light, the photoelectric conversion elements generate electrical charges in accordance with an intensity of the light, and the generated electrical charges are read out sequentially, whereby an image of a subject can be converted into electrical signals.

In order to obtain a color image using the CCD, a color filter containing plural primary color components is applied on a light receiving surface side of the image capturing element, so that light with a predetermined primary color component is inputted into the respective photoelectric conversion elements, whereby an image signal of a color component corresponding to each pixel can be obtained. As the filter used in this case, a Bayer matrix using a filter for each color of R (red), G (green) and B (blue) is well known.

With the image capturing element using the filter with the Bayer matrix, each photoelectric conversion element can obtain only the signal of a color component corresponding to the applied color filter. For example, the photoelectric conversion element covered with the filter for R cannot provide signals of G and B. Therefore, for each pixel, data concerning a primary color component that cannot be obtained directly from the photoelectric conversion elements can be obtained by implementing interpolation process using primary color component data of adjacent pixels having said primary color component. This makes it possible to obtain color image data of the subject for each pixel by using one image capturing element.

When image-capturing is performed by using the filter with the Bayer matrix, it has been known that a false color appears at a portion that contains a high-frequency spatial frequency component in the image of the subject. To deal with this, in general, a process of obscuring the false color is implemented for a region that contains the high frequency component, such that color-difference is reduced and the chroma is suppressed. However, through the suppression of chroma, a so-called "color omission" is likely to occur. In particular, the "color omission" is visually remarkable in a high chroma region, and makes the captured image unnatural.

In view of the facts described above, there has been disclosed a technique of suppressing the false color in a low chroma region while reducing the color omission in the high chroma region (see, for example, Japanese Patent No. 3633561). According to Japanese Patent No. 3633561, an image signal represented in a color space having three primary color components is converted into an image signal represented in a YCbCr color space having a brightness signal Y, color difference signals Cr (=R−Y) and Cb (=B−Y) (R and B represent image signals of a red color component and a blue color component, respectively). The degree of the high frequency component that the brightness signal has in the vicinity of each image is detected on the basis of the brightness signal Y, and the chroma is obtained on the basis of the color difference signals Cb and Cr to detect the low chroma region. With this process, the color difference signals are suppressed for a pixel in the detected low chroma region in accordance with the degree of the high frequency component, and the color difference signals are not suppressed (or is reduced) for the pixel in the high chroma region.

SUMMARY OF THE INVENTION

However, according to the conventional technique, the color component signal used at the time of detecting the low chroma region already contains the false color, causing incorrect detection of the low chroma region, whereby the false color cannot be sufficiently suppressed at the low chrome region. For example, according to the invention disclosed in Japanese Patent No. 3633561, the chroma is obtained by obtaining a sum of absolute values of color difference signals Cr and Cb. However, since these signals contain the false color component (R−B), an area that is actually a low chroma area cannot be detected as the low chroma area when a large amount of high frequency component is included in the image. As a result, the false color is not suppressed sufficiently in the low chroma region where the false color is conspicuous, possibly deteriorating quality of the image.

In view of the facts described above, an object of the present invention is to provide an image processing device capable of reproducing further natural images, by improving detection accuracy in a low chroma region of a subject image, thereby suppressing false color in the low chroma region and improving performance for suppressing occurrence of "color omission" in a high chroma region.

To achieve the object above, a first aspect of an image processing device of the present invention provides an image processing device that processes image signals from an image capturing element in which a plurality of types of photoelectric conversion elements each outputting an image signal of any one of a plurality of primary color components are arranged for each pixel in accordance with a predetermined arrangement rule for each pixel; the image processing device, which includes: an interpolation unit for implementing an interpolation process to image signals of respective pixels received from the image capturing element by using image signals of adjacent pixels to obtain an image signal of a plurality of primary colors for each of the pixels; a high-frequency component extracting unit for extracting a high frequency component contained in the image signals received from the image capturing element; a false-color reduced color signal generation unit for obtaining a false-color reduced color signal in which an effect of a false color is reduced, from the image signals of the plurality of primary colors for the respective pixels; a chroma signal generation unit for generating a chroma signal for each of the pixels on the basis of the signal value of the false-color reduced color signal; and, a suppression unit for suppressing the false color contained in the image signals of the plurality of primary colors for the respective pixels on the basis of the chroma signal and the high frequency component.

A second aspect of the present invention provides the image processing device according to the first aspect of the present invention, in which the image capturing element is formed such that primary colors R, G and B are arranged in a Bayer matrix, and the false-color reduced color signal generation unit generates a (R+B) component as the false-color reduced color signal.

To achieve the object above, a third aspect of an image processing device of the present invention provides an image processing device that processes image signals from an image capturing element in which a plurality of types of photoelectric conversion elements each outputting an image signal of any one of a plurality of primary color components are arranged for each pixel in accordance with a predetermined arrangement rule for each pixel, the image processing device which includes: an interpolation unit for implementing an interpolation process to image signals of respective pixels received from the image capturing element by using image signals of adjacent pixels to obtain an image signal of a plurality of primary colors for each of the pixels; a color space conversion unit for converting the image signal of the plurality of primary color components obtained by the interpolation unit for the respective pixels into image signals represented in a color space having a brightness component and color components; a high-frequency component extracting unit for extracting a high frequency component of a signal value of a brightness component for each of the pixels on the basis of a signal value of the brightness component; a false-color reduced color signal generation unit for obtaining, for each of the pixels, a false-color reduced color signal in which an effect of a false color is reduced, on the basis of a signal value of the color component; a chroma signal generation unit for generating a chroma signal for each of the pixels on the basis of the signal value of the false-color reduced color signal; and, a suppression unit for suppressing the signal value of the color component on the basis of the chroma signal and the high frequency component.

A fourth aspect of the present invention provides the image processing device according to the third aspect of the present invention, in which the image capturing element is formed such that primary colors R, G and B are arranged in a Bayer matrix, the color space having a brightness component and color components is a YCbCr color space, and, a linear sum of a Cb component and a Cr signal component is generated as the false-color reduced color signal.

EFFECT OF THE INVENTION

According to the present invention, it is possible to reproduce a further natural image by improving a detection accuracy of a chroma in a subject image, thereby suppressing a false color in a low chroma region and improving a performance of suppressing occurrence of "color omission" in a high chroma region, such that a false-color reduced color signal in which an effect of a false color is reduced is obtained from image signals of plural primary colors for respective pixels, and a chroma signal is generated for each of the pixels on the basis of the obtained false-color reduced color signal.

BRIEF DESCRIPTION OF THE DRAWINGS

FIG. 2 is a view illustrating a primary-color Bayer matrix of a color filter for use in an image capturing element of an image capturing section;

MODE FOR CARRYING OUT THE INVENTION

Hereinbelow, embodiments of the present invention will be described with reference to the drawings.

First Embodiment

Figure 1:
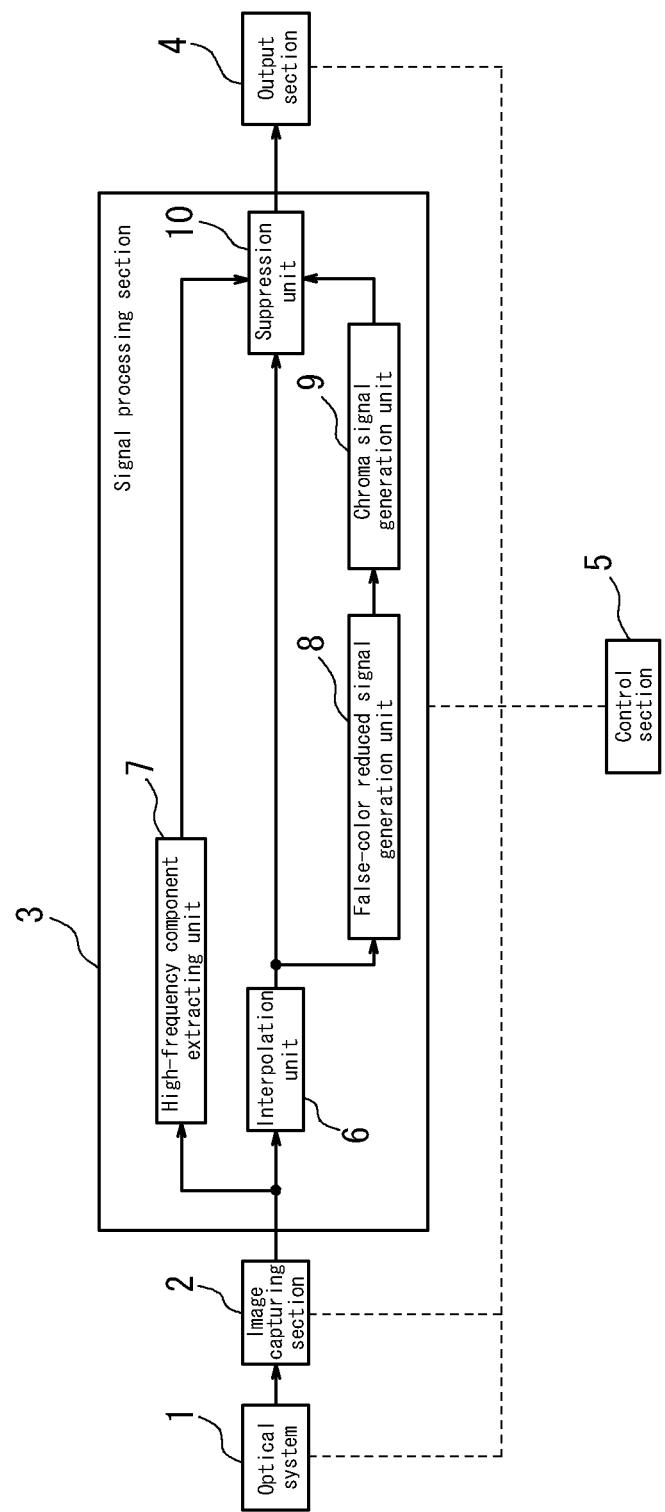
FIG. 1 is a block diagram illustrating a schematic configuration of a digital camera having an image processing device according to a first embodiment of the present invention.

First, the first embodiment of an image processing device according to the present invention will be described. This embodiment is an example in which the image processing device according to the present invention is applied to a digital camera. FIG. 1 is a block diagram illustrating a schematic configuration of a digital camera having the image processing device according to the present invention. This embodiment has means for generating a color signal in which the false color is reduced and which is used at the time of detecting a low chroma region, and is characterized in that a process of reducing the false color is implemented to a color component signal in the detected low chroma region.

The digital camera in FIG. 1 includes an optical system 1, an image capturing section 2, a signal processing section 3 corresponding to the image processing device according to the present invention, an output section 4, and a control section 5. The optical system 1 includes an image capturing lens, a diaphragm and a shutter, which are not shown, and the image capturing section 2 includes an image capturing element, an analog amplifier, an analog-to-digital converter, and a buffer, which are not shown. The signal processing section 3 includes a not-shown color adjustment section for implementing a false-color suppressing process to image information received from the image capturing section 2, and implementing a gradation adjustment process and a color adjustment process to the image information that has been subjected to the false-color suppressing process. The output section 4 includes a not-shown liquid crystal display for displaying an outputted image outputted from the image processing section 3, a not-shown data compression section for compressing the outputted image, a not-shown memory card for storing the compressed outputted image, and the like. The control section 5 includes a not-shown CPU connected with the optical system 1, the image capturing section 2, the signal processing section 3 and the output section 4, for controlling each of said sections, a not-shown operation button for receiving operation from a user, and the like.

Figure 2:
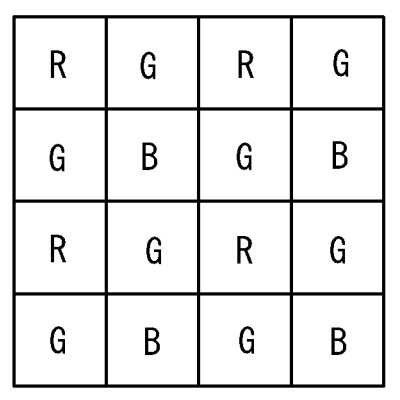

The image capturing element of the image capturing section 2 is provided with a filter with a primary-color Bayer matrix such that a filter for one color is disposed on a light receiving surface of each photoelectric conversion element. This filter has a structure in which a color filter with three primary colors of R (red), G (green) and B (blue) are two-dimensionally arranged in a matrix formation as shown in FIG. 2, such that a filter for 2×2 pixels arranged in the order of R-G-G-B from a left upper portion to a right lower potion is repeatedly arranged in a vertical and a horizontal directions.

The signal processing section 3 includes an interpolation unit 6, a high-frequency component extracting unit 7, a false-color reduced color signal generation unit 8, a chroma signal generation unit 9 and a suppression unit 10.

The interpolation unit 6 implements an interpolation process to an image signal of each of the pixels received from the image capturing section 2 by using image signals of adjacent pixels to obtain image signals of the primary color components R, G, B for the respective pixels. For example, for a pixel that can obtain an image signal of the R component through the photoelectric conversion element, the interpolation process is implemented to obtain the G and the B components by using the signal values of G and B components obtained by the adjacent photoelectric conversion elements.

The high-frequency component extracting unit 7 extracts a high frequency component contained in the image signal received from the image capturing section 2. More specifically, the high frequency component is extracted by using the signal of G component before the interpolation process.

The false-color reduced color signal generation unit 8 calculates a false-color reduced color signal in which an effect of the false color is reduced, on the basis of the image signals of plural primary color components of the respect pixels received from the interpolation unit 6, and outputs the calculated signal. The chroma signal generation unit 9 generates a chroma signal for each of the pixels on the basis of the signal value of the false-color reduced color signal outputted from the false-color reduced color signal generation unit 8.

The suppression unit 10 implements a suppression process to the image signals of the respective pixels received from the interpolation unit 6 to suppresses a false color contained in the image signal of the plural primary colors on the basis of the chroma signal received from the chroma signal generation unit 9 and the high frequency component received from the high-frequency component extracting unit 7.

Figure 3:
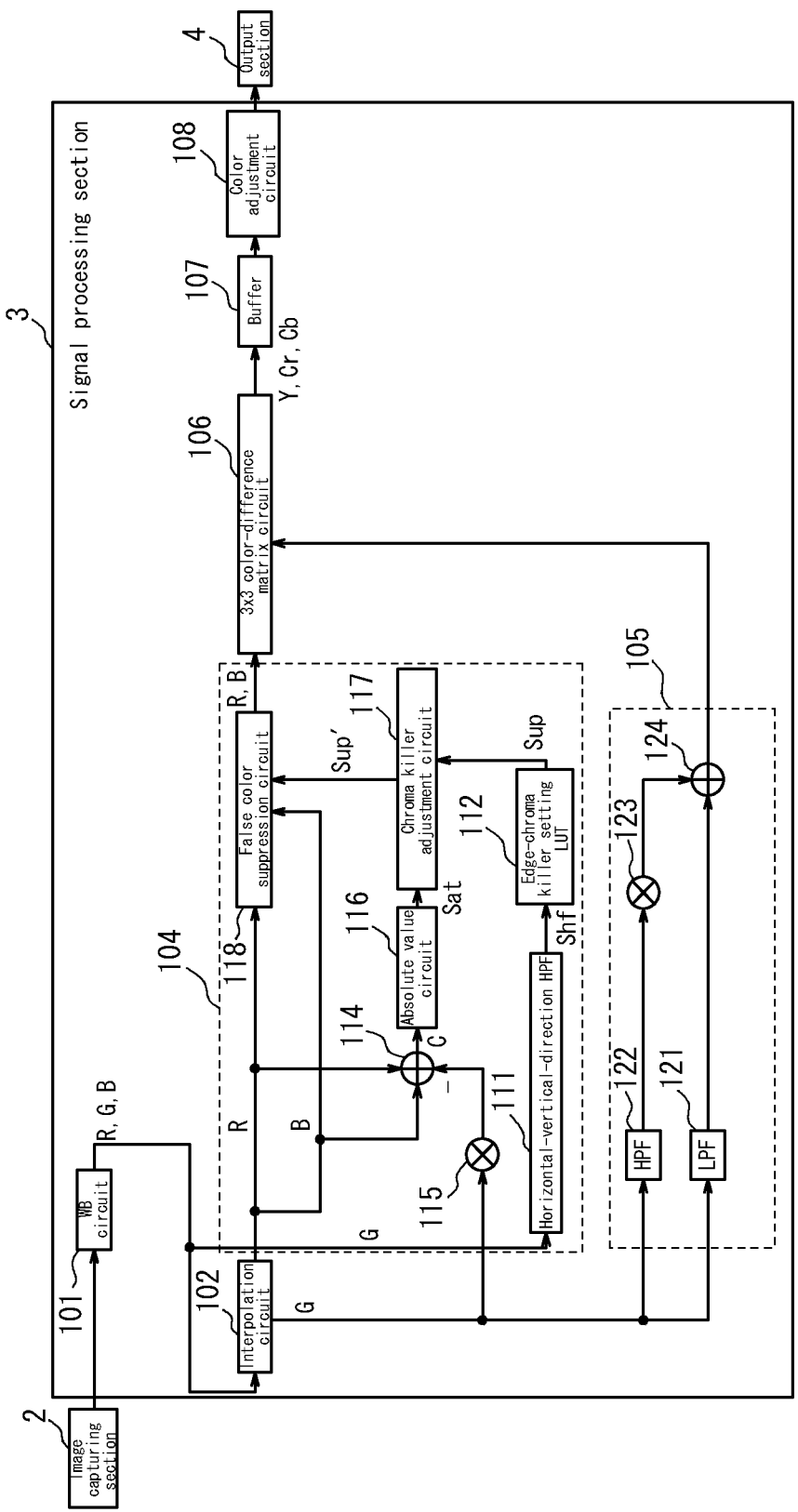
FIG. 3 is a block diagram illustrating a detailed configuration of a signal processing section of the digital camera according to the first embodiment.

Next, the signal processing section 3 will be described in detail with reference to FIG. 3. FIG. 3 is a block diagram illustrating a detailed configuration of the signal processing section of the digital camera according to the first embodiment.

The signal processing section 3 includes a white balance circuit (WB circuit) 101, an interpolation circuit 102 serving as the interpolation unit, a false color suppression section 104, an edge enhancement processing section 105, a 3×3 color-difference matrix circuit 106, a buffer 107, and a color adjustment circuit 108.

The false color suppression section 104 includes a horizontal-vertical-direction high pass filter 111, an edge-chroma killer setting look-up table (LUT) 112, an adder 114, an integrator 115, an absolute value circuit 116, a chroma killer adjustment circuit 117 and a false color suppression circuit 118. The horizontal-vertical-direction high pass filter 111 and the edge-chroma killer setting look-up table (LUT) 112 constitute the high-frequency component extracting unit 7; the adder 114 and the integrator 115 constitute the false-color reduced color signal generation unit 8; the absolute value circuit 116 constitutes the chroma signal generation unit 9; and the chroma killer adjustment circuit 117 and a false color suppression circuit 118 constitute the suppression unit 10.

The edge enhancement processing section 105 includes a low pass filter (LPF) 121, a high pass filter (HPF) 122, an edge enhancement circuit 123 and an edge adder 124.

With the configuration described above, when a shutter button is depressed, the image capturing lens, the diaphragm and the shutter in the optical system 1 are activated in accordance with control by the control section 5 described in FIG. 1. Then, the image capturing section 2 is activated; an subject image formed by the optical system 1 is photoelectrically converted by the image capturing element of the image capturing section 2; the converted image is subjected to an analog amplified process and an analog-to-digital conversion process; and, the digitized image data is temporarily stored in the buffer in the image capturing section 2. As this embodiment employs the image capturing element with the primary-color Bayer matrix, the obtained image data is an image data in which data formed by any one of R, G and B colors from the respective pixels are arranged in a mosaic manner.

Next, the signal processing section 3 reads out the image data from the buffer in the image capturing section 2 to process the read out data. The processes in the image processing section will be described with reference to FIG. 3. Below, processes in the respective sections are implemented for each pixel using the data of the adjacent pixels as needed.

The image data read out from the image capturing section 2 is inputted into the WB circuit 101. The WB circuit 101 implements a white balance process to adjust gains of the R signal and the B signal in the inputted image data on the basis of a white balance correction coefficient calculated by the control section 5.

The interpolation circuit 102 implements an interpolation filter process separately to the R signal, the G signal and the B signal in the image data outputted from the WB circuit 101 to generate color signal components that are not obtained from the respective pixels.

In the edge enhancement processing section 105, the HPF 122 extracts the high frequency component of the G signal outputted from the interpolation circuit 102. The edge enhancement circuit 123 adjusts the gain of the high frequency component of the G signal outputted from the HPF 122 to implement an edge enhancement process to the image. The LPF 121, on the other hand, extracts the lower frequency component of the G signal outputted from the interpolation circuit 102. The edge adder 124 adds the high frequency component of the G signal outputted from the edge enhancement circuit 123 and having the enhanced edge, to the low frequency component of the G signal outputted from the LPF 121, and outputs the G signal having the enhanced edge.

Figure 4:
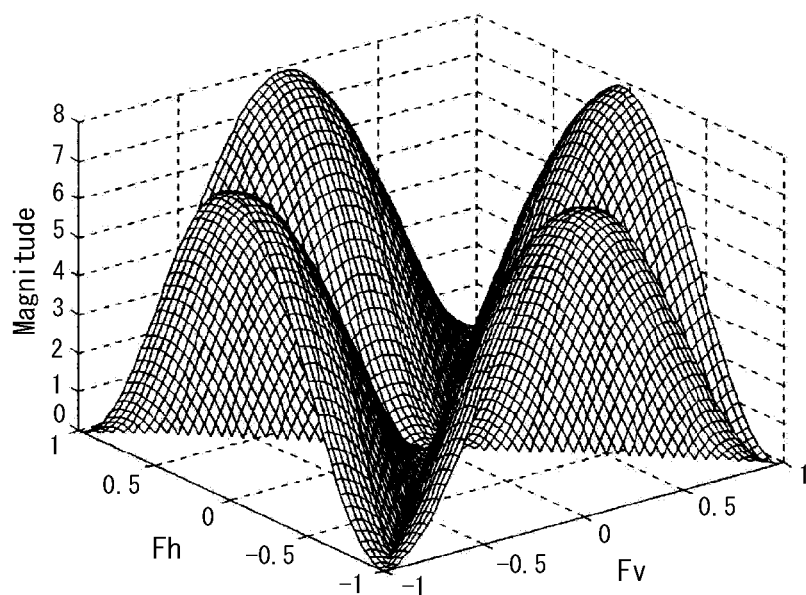
FIG. 4 is a view illustrating a frequency characteristic of a horizontal-vertical-direction high pass filter (HPF)

The horizontal-vertical-direction HPF 111 in the false color suppression section 104 applies a high-pass filter having a frequency characteristic shown in FIG. 4 to the Bayer G signal outputted from the WB circuit 101 to extract the high-frequency component in the vicinity of the Nyquist frequency in the horizontal and vertical directions. In FIG. 4, coordinate axes Fh and Fv represent frequencies in the horizontal direction and the vertical direction, respectively, setting a special frequency corresponding to a pixel pitch at 1.

Figure 5:
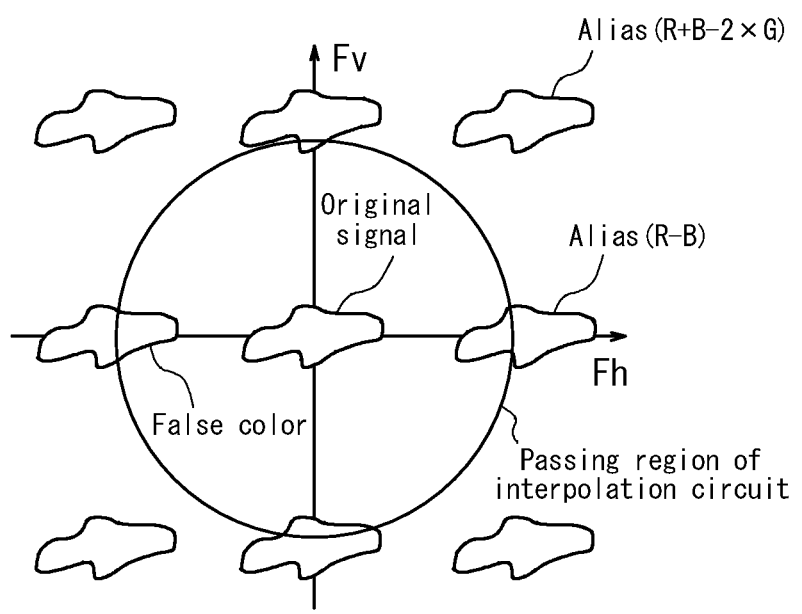
FIG. 5 is a view illustrating a spectrum of the image signal through a primary-color Bayer matrix.

Here, with reference to FIG. 5, a frequency spectrum of the image signal through a primary-color Bayer matrix will be described. With the primary-color Bayer matrix, an alias component of R−B appears at a position of the Nyquist frequency in the horizontal and the vertical directions, and an alias component of R+B−2×G appears at a position of the two times the Nyquist frequency in the oblique direction. For this signal, signals of color components not obtained from each of the pixels are generated, and accordingly, the alias component of R−B appearing at the position of the Nyquist frequency in the horizontal and the vertical directions is also extracted at the time of applying the interpolation filter, resulting in occurrence of the false color. In view of the fact described above, this embodiment detects the high frequency component by using the G signal that does not involve the alias component at the position of the Nyquist frequency in the horizontal and the vertical directions to estimate the presence or absence of the false color of R−B occurring when the image signal contains the high frequency component in the vicinity of the Nyquist frequency in the horizontal and the vertical directions. The horizontal-vertical-direction HPF 111 takes an absolute value of the detected high frequency component to generate a high-frequency component intensity Shf.

Figure 6:
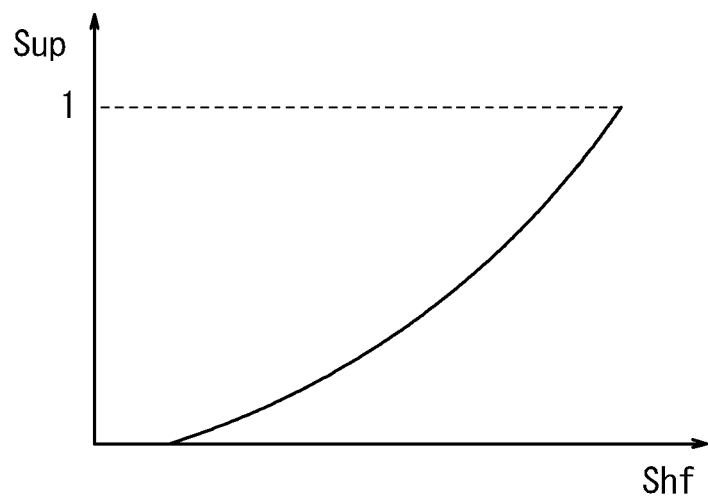
FIG. 6 is a graph illustrating a relationship between an input value of a high-frequency component intensity Shf and an output value of an false-color suppression amount Sup through an edge-chroma killer setting LUT.

The high-frequency component Shf extracted by the horizontal-vertical-direction HPF 111 is inputted into the edge-chroma killer setting (LUT) 112. The edge-chroma killer setting (LUT) 112 converts the high-frequency component Shf into a false-color suppression amount Sup on the basis of a graph representing a relationship between an input value of the high-frequency component intensity Shf and an output value of the false-color suppression amount Sup as illustrated in FIG. 6. Then, the false-color suppression amount Sup based on the high-frequency component intensity Shf contained in the image signal can be obtained.

In order to reduce the error caused by the false color contained in the color signal at the time of detecting a low chroma region, it is only necessary to calculate the chroma signal so as not to contain the R−B component. A black and white image (R=G=B) having vertical stripes will be discussed below as an example of a case where a sampling process through the Bayer matrix is applied to an image containing the high frequency in the horizontal or vertical direction, which is a target of this embodiment. When the image through the Bayer matrix is divided into the G component and (R+B) component, both signals result in the same, which means that the image is not affected by the false color. Therefore, the low chroma region can be detected accurately by generating the R+B component by the adder 114 and combining the generated R+B component with the G component that does not inherently contain the alias component to calculate the false-color reduced color signal C (=R+B−2×G).

More specifically, the integrator 115 adjusts a gain of the G signal outputted from the interpolation circuit 102. The adder 114 adds the R signal and the B signal outputted from the interpolation circuit 102, and subtracts the G signal whose gain has already been adjusted by the integrator 115. Through this process, the false-color reduced color signal C (=R+B−2×G) can be calculated. By setting the gain of the integrator 115 at 2, the chroma signal C becomes zero at the time of no chroma signal.

Next, the absolute value circuit 116 obtains an absolute value of the false-color reduced color signal C outputted from the adder 114, and a chroma signal Sat corresponding to the chroma in the color component signal. The chroma killer adjustment circuit 117 receives the false-color suppression amount Sup outputted from the edge-chroma killer setting (LUT) 112 and the chroma signal Sat outputted from the absolute value circuit 116 to output a corrected false-color suppression amount Sup'. The calculation of the corrected false-color suppression amount Sup' will be described below.

Figure 7:
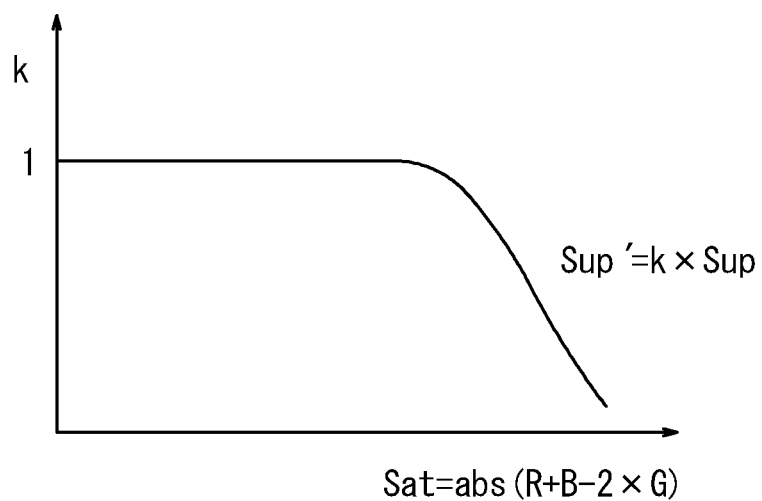
FIG. 7 is a graph illustrating a relationship between an input value of the chroma signal Sat and an output value of a false-color suppression amount adjustment value k through a chroma killer adjustment circuit.

First, a false-color suppression amount adjustment value k is obtained by inputting the chroma signal Sat using the look up table according to a graph illustrated in FIG. 7. The false-color suppression amount adjustment value k is close to 1 in the low chroma region in which the chroma signal is small, and is smaller than 1 in the high chroma region in which the chroma signal is large. Then, the corrected false-color suppression amount Sup' (=k×Sup) is obtained by multiplying the false-color suppression amount adjustment value k by the false-color suppression amount Sup.

The false color suppression circuit 118 receives the R and the B signals outputted from the interpolation circuit 102, and the corrected false-color suppression amount Sup' outputted from the chroma killer adjustment circuit 117, and outputs an R signal and a B signal in which the false color is suppressed. For the R signal and the B signal, the false color is suppressed on the basis of the corrected false-color suppression amount Sup' by the following expressions. Through a process according to the expressions below, the amount of false color component (R−B) contained in the R signal and the B signal is reduced in accordance with the corrected false-color suppression amount Sup'.

$$R=(R+B)/2+(1-Sup')\times(R-B)/2$$

$$B=(R+B)/2-(1-Sup')\times(R-B)/2$$

As a result, control is performed such that the effect of suppressing the false color based on the high-frequency component intensity Shf is made large in the region where the chroma signal Sat is small, and the effect of suppressing the false color is made small in the region where the chroma signal Sat is large.

The 3×3 color-difference matrix circuit 106 converts the R signal and the B signal having the suppressed false color and outputted from the false color suppression circuit 118 and the G signal outputted from the edge adder 124 and having the enhanced edge, into a YCbCr colorimetric system to generate the brightness signal Y and the color-difference signals Cb and Cr. The brightness signal Y and the color-difference signals Cb and Cr are temporarily stored in the buffer 107.

The output section 4 reads out the color image in the buffer 107, compresses the data, and then records it in a memory card. When an image displaying button is operated to display the image, the control section 5 controls such that: the output section 4 reads out the color image in the buffer 107, and the color adjustment circuit 108 implements a gradation conversion process to the Y signal and an adjustment process to the Cb signal and the Cr signal to display the color image on the liquid crystal display.

As described above, according to this embodiment, it is possible to reproduce the further natural image by improving the detection accuracy of the chroma in the subject image, thereby suppressing the false color in the low chroma region and improving the performance of suppressing the occurrence of "color omission" in the high chroma region, such that: the false-color reduced color signal C in which the effect of the false color is reduced is obtained; the chroma signal Sat corresponding to the chroma is generated for each of the pixels on the basis of the obtained false-color reduced color signal C; and, control is performed such that the effect of suppressing the false color based on the high-frequency component Shf is made large in the region where the chroma signal Sat is small, and the effect of suppressing the false color is made small in the region where the chroma signal Sat is large. Further, it is possible to reproduce the further natural image by further improving the detection accuracy of the chroma in the subject image, such that the color filter with the Bayer matrix is used as the image capturing element, and the (R+B) component that does not contain the false color is generated as the false-color reduced color signal C.

Second Embodiment

Figure 8:
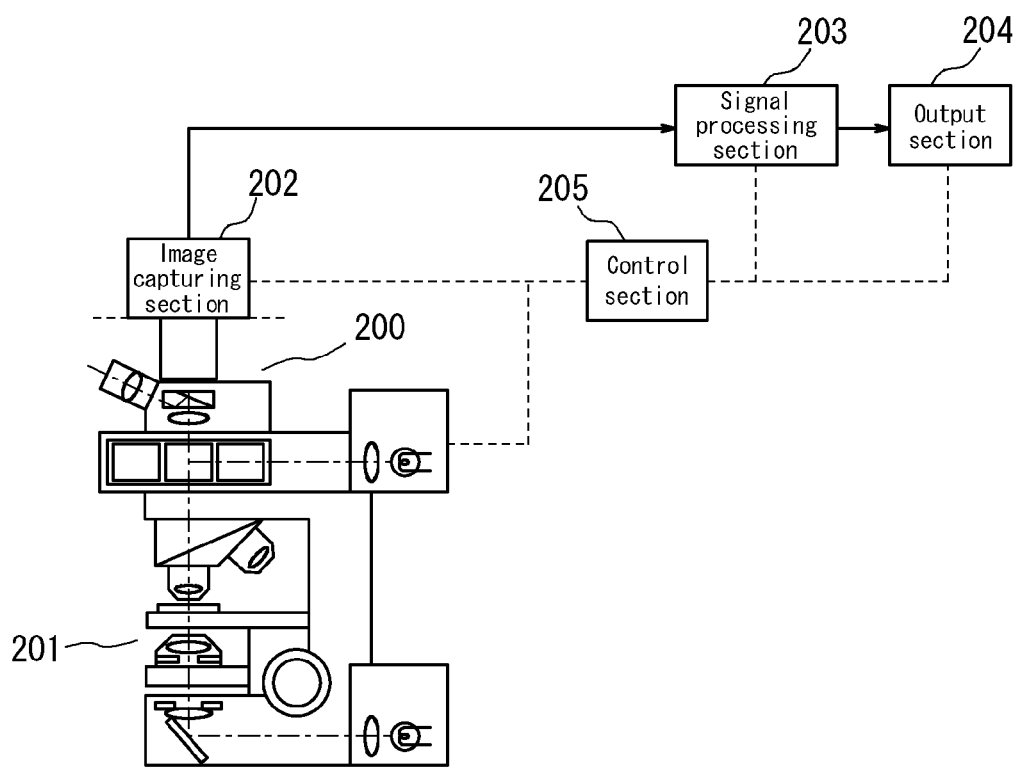
FIG. 8 is a view illustrating a schematic configuration of a microscope having an image processing device according to a second embodiment of the present invention.

Next, the second embodiment of the image processing device according to the present invention will be described. In this embodiment, an image processing device similar to the image processing device according to the first embodiment is installed in a microscope. FIG. 8 illustrates a schematic configuration of a microscope according to the second embodiment of the present invention.

According to this embodiment, a microscope 200 includes a microscope body 201 having an illumination optical system, an observation optical system, a sample stage and the like; an image capturing section 202; a signal processing section 203; an output section 204; and a control section 205. Explanations of the image capturing section 202, the signal processing section 203, the output section 204 and the control section 205 are omitted because those have almost the same configurations and operations as the image capturing section 2, the signal processing section 3, the output section 4 and the control section 5, respectively, in the first embodiment.

With the configuration described above, similar to the first embodiment, it is possible to reproduce the further natural image by improving the detection accuracy of the chroma in the subject image, thereby suppressing the false color in the low chroma region and improving the performance of preventing the occurrence of "color omission" in the high chroma region.

In particular, in the field of the microscope observation of cellular tissues, a hematoxylin and eosin stain (HE stain) is employed as a typical staining method. When a sample is photographed using such a staining method to obtain an RGB image thereof, there is a possibility that a stained image with clear chroma cannot be obtained in a case where the false color is excessively suppressed in the high frequency region. In such a staining method, the (R−B) component tends to be relatively small, and hence, it is particularly preferable that the low chroma region is detected by using the chroma signal according to this embodiment.

Third Embodiment

Figure 9:
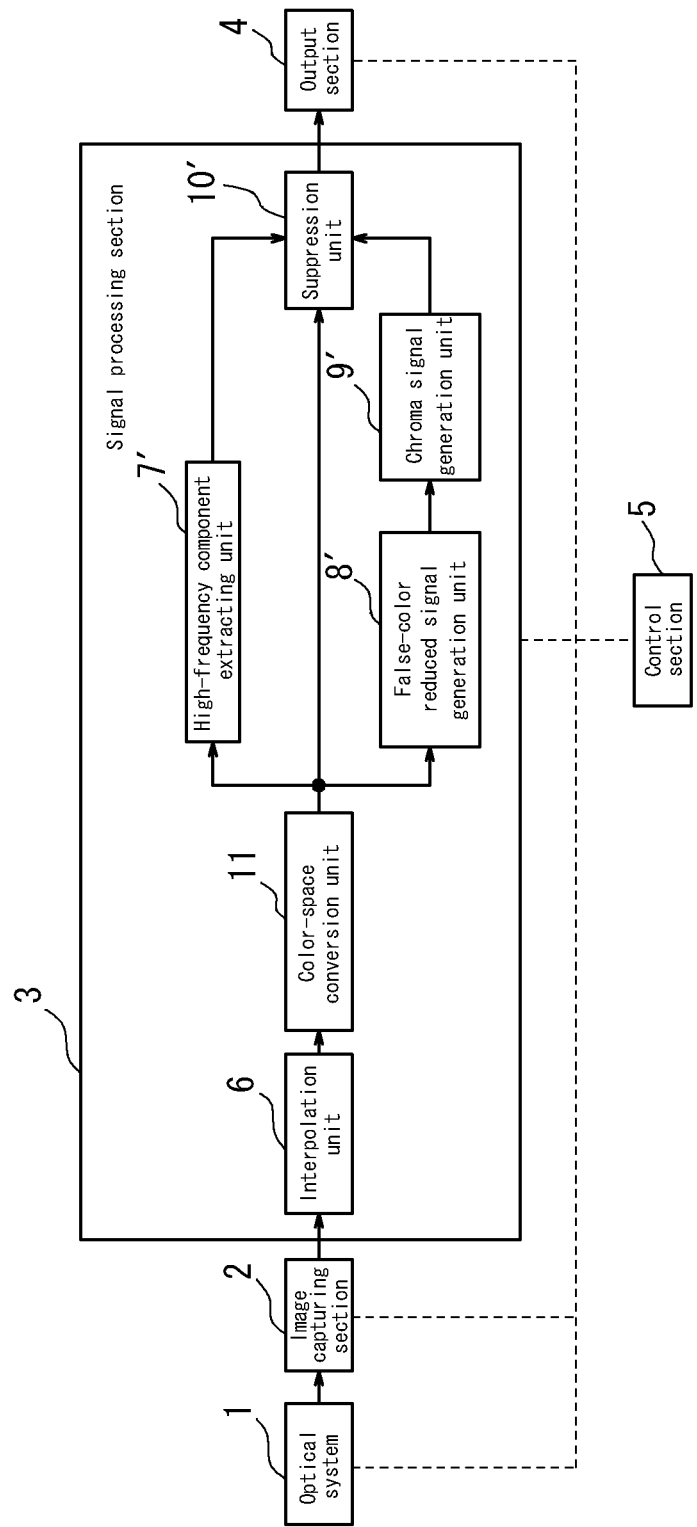
FIG. 9 is a block diagram illustrating a schematic configuration of a digital camera having an image processing device according to a third embodiment of the present invention.

Next, the third embodiment of the image processing device according to the present invention will be described. This embodiment is configured that, in the digital camera according to the first embodiment, suppression of the false color by the signal processing section 3 is not implemented to image signals of the primary colors of the respective pixels, but those image signals are converted into image signals represented in another color space and the suppression of the false color is implemented to the converted image signals. FIG. 9 is a block diagram illustrating a schematic configuration of the digital camera according to this embodiment of the present invention.

According to this embodiment, the signal processing section 3 includes the interpolation unit 6, a color-space conversion unit 11, a high-frequency component extracting unit 7', a false-color reduced color signal generation unit 8', a chroma signal generation unit 9' and a suppression unit 10'.

The color-space conversion unit 11 coverts image signals of the primary colors of the respective pixels outputted from the interpolation unit 6 into image signals represented in another color space. The high-frequency component extracting unit 7', the false-color reduced color signal generation unit 8', the chroma signal generation unit 9' and the suppression unit 10' implement processes similar to the high-frequency component extracting unit 7, the false-color reduced color signal generation unit 8, the chroma signal generation unit 9 and the suppression unit 10 according to the first embodiment, to the image signal represented in the color space converted by the color-space conversion unit 11. The other configurations, that is, the optical system 1, the image capturing section 2, the interpolation unit 6, the output section 4 and the control section 5 are configured similarly to those in the first embodiment. Therefore, the same reference characters are applied thereto and explanations thereof are omitted.

Figure 10:
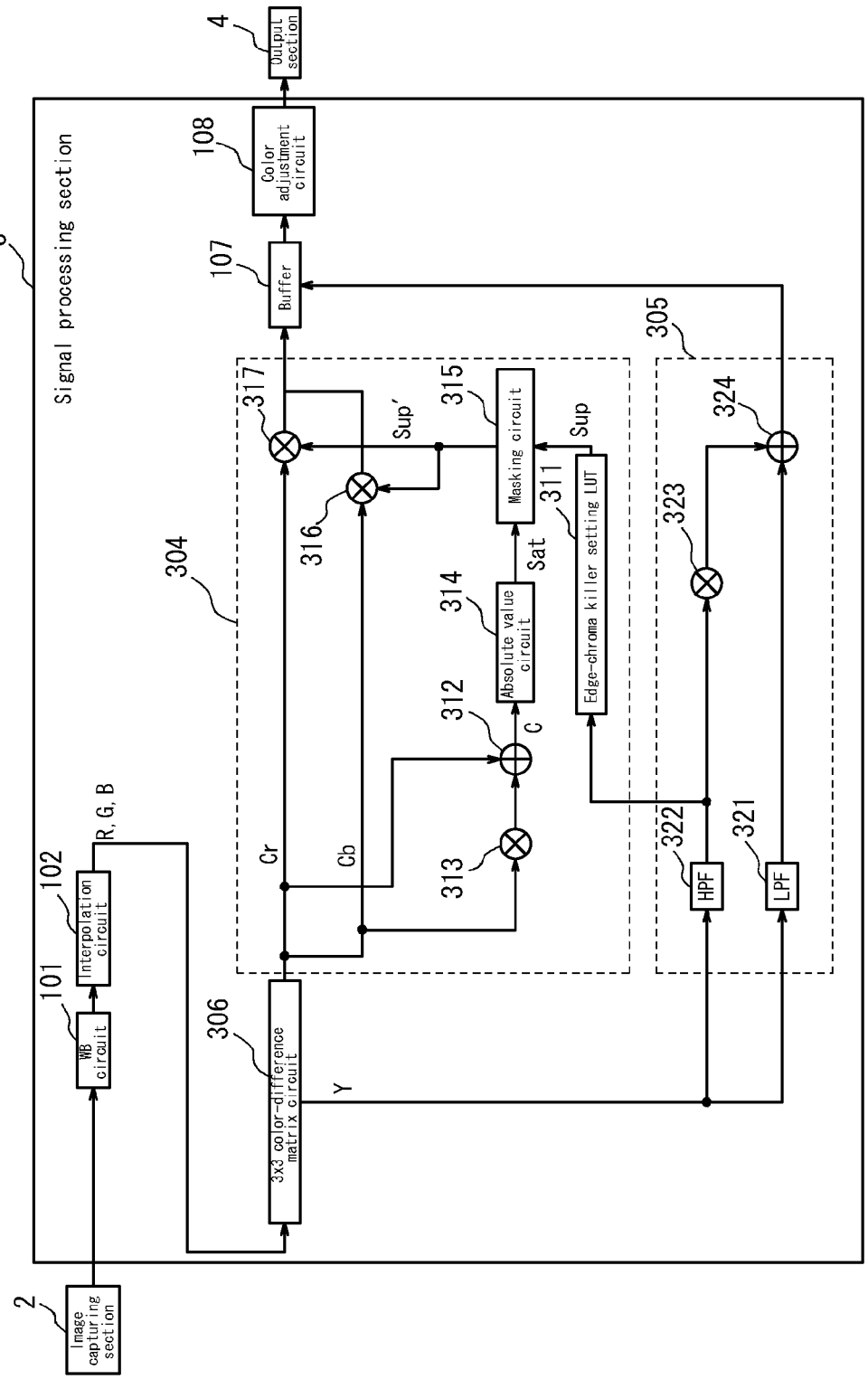
FIG. 10 is a block diagram illustrating a more detailed configuration of a signal processing section of the digital camera according to the third embodiment.

Next, the signal processing section 3 will be described in more detail with reference to FIG. 10. FIG. 10 is a block diagram illustrating the more detailed configuration of the signal processing section of the digital camera according to the third embodiment.

According to the third embodiment, the signal processing section 3 includes the white balance circuit (WB circuit) 101, the interpolation circuit 102, a 3×3 color-difference matrix circuit 306, a false color suppression section 304, an edge enhancement processing section 305, the buffer 107, and the color adjustment circuit 108. Of those sections, the white balance circuit (WB circuit) 101, the interpolation circuit 102, the buffer 107, and the color adjustment circuit 108 have the configurations and operations similar to those in the first embodiment. Therefore, the same reference characters are applied to the corresponding sections, and explanations thereof are omitted.

The 3×3 color-difference matrix circuit 306 is provided after the interpolation circuit 102, and converts the RGB signal into a Y signal representing a brightness signal, a Cb signal and Cr signal representing the color difference signals in the YCbCr colorimetric system.

The false color suppression section 304 includes an edge-chroma killer setting LUT 311, an adder 312, an integrator 313, an absolute value circuit 314, a masking circuit 315, a Cb integrator 316 and a Cr integrator 317. The edge-chroma killer setting LUT 311 constitutes the high-frequency component extracting unit 7', the adder 312 and the integrator 313 constitute the false-color reduced color signal generation unit 8', the absolute value circuit 314 constitutes the chroma signal generation unit 9', and the masking circuit 315, the Cb integrator 316 and the Cr integrator 317 constitute the suppression unit 10'.

The edge enhancement processing section 305 includes a low pass filter (LPF) 321, a high pass filter (HPF) 322, an edge enhancement circuit 323 and an edge adder 324.

In the edge enhancement processing section 305, the HPF 322 extracts a high frequency component in a Y signal outputted from the 3×3 color-difference matrix circuit 306. The edge enhancement circuit 323 adjusts a gain of the high frequency component in the Y signal outputted from the HPF 322, and implements an edge enhancement process to an image. The LPF 321 extracts a low frequency component in the Y signal outputted from the 3×3 color-difference matrix circuit 306. The edge adder 324 adds the high frequency component of the Y signal outputted from the edge enhancement circuit 323 and having the enhanced edge, to the low frequency component of the Y signal outputted from the LPF 321, and outputs the Y signal having the enhanced edge.

The edge-chroma killer setting LUT 311 in the false color suppression section 304 takes an absolute value of the high frequency component of the Y signal outputted from the HPF 322 to obtain a high frequency component intensity Shf. The high frequency component intensity Shf is converted into a false-color suppression amount Sup based on a method similar to the edge-chroma killer setting LUT 112 in the first embodiment.

The integrator 313 adds an adjustment coefficient kCb set by the control section 5 to the Cb signal outputted from the 3×3 color-difference matrix circuit 306. The adder 312 adds the adjustment Cb signal (=kCb×Cb) outputted from the integrator 313 to the Cr signal outputted from the 3×3 color-difference matrix circuit 306 to generate and output a false-color reduced color signal C (=kCb×Cb+Cr). The adjustment coefficient kCb is set in the following manner.

The RGB signal is converted into the YCbCr signal in accordance with the following expressions.

$$Y=0.299 \times R+0.587 \times G+0.114 \times B$$

$$Cr=0.5 \times R-0.419 \times G-0.081 \times B$$

$$Cb=-0.168 \times R-0.332 \times G+0.5 \times B$$

Therefore, inverse conversion is made in accordance with the following expressions.

$$R=Y+1.4 \times Cr-0.0009 \times Cb$$

$$G=Y-0.713 \times Cr-0.344 \times Cb$$

$$B=Y-0.0028 \times Cr+1.77 \times Cb$$

Accordingly, the false-color reduced color signal C can be calculated by the following expressions.

$$C=R+B-2 \times G=2.83 \times Cr+2.46 \times Cb$$

As described above, the adjustment coefficient kCb set for the integrator 313 can be obtained from the following expression.

$$kCb=2.46/2.83=0.87$$

The absolute value circuit 314 receives the false-color reduced color signal C outputted from the adder 312, and obtains an absolute value thereof to output it as a chroma signal Sat. The masking circuit 315 converts the false-color suppression amount Sup outputted from the edge-chroma killer setting LUT 311 into a corrected false-color suppression amount Sup' in accordance with the chroma signal Sat outputted from the absolute value circuit 314.

The masking circuit 315 implements a conversion process in the following manner. The chroma signal Sat is compared with a threshold value Sth set by the control section 5. If the chroma signal Sat is smaller than the threshold value Sth, the corrected false-color suppression amount Sup' is set to 1. If the chroma signal Sat is equal to or larger than the threshold value Sth, the corrected false-color suppression amount Sup' is set by the expression: Sup'=1−Sup×(Sat−Sth). As a result, the corrected false-color suppression amount Sup' according to the high frequency component intensity Shf is generated in the low chroma region, and the corrected false-color suppression amount Sup' having a constant value regardless of the high frequency component intensity Shf is generated in the high chroma region.

The Cb integrator 316 adds the corrected false-color suppression amount Sup' outputted from the masking circuit 315 to the Cb signal outputted from the 3×3 color-difference matrix circuit 306 to suppress the false color contained in the Cb signal. The Cr integrator 317 adds the corrected false-color suppression amount Sup' outputted from the masking circuit 315 to the Cr signal outputted from the 3×3 color-difference matrix circuit 306 to suppress the false color contained in the Cr signal.

The Cb signal having the suppressed false color and outputted from the Cb integrator 316, the Cr signal having the suppressed false color and outputted from the Cr integrator 317, and the Y signal having the enhanced edge and outputted from the edge adder 324 are inputted into and temporarily stored in the buffer 107. Other operations are similar to those in the first embodiment, and thus, explanations thereof are omitted.

As described above, it is possible to eliminate the effect of the false color contained in the color signal at the time of detecting the low chroma region, by first obtaining the false-color reduced color signal C and then obtaining the chroma signal Sat (=abs (C)).

Calculation is complicated when the YCbCr signal is inversely converted into the RGB, and then the false-color reduced color signal C is obtained. However, by using the processing method described above, it is possible to obtain the false-color reduced color signal C by the simple configuration formed by a single adder and a single integrator.

In the example described above, the adjustment coefficient kCb is a value close to 1. Therefore, the integrator 313 can be omitted by obtaining the false-color reduced color signal C by using the following expression, so that the low chroma region can be accurately detected with a further smaller circuit.

$$C=Cr+Cb$$

As described above, according to this embodiment, the image signals of the primary color components are converted into the image signals represented in the YCbCr color space; the high frequency component is extracted from the Y signal representing the signal value of the brightness component; the false-color reduced color signal C in which the effect of the false color is reduced is obtained from the Cb and Cr signals representing the signal values of the color components; and, the chroma signal corresponding to the chroma is generated for the respective pixels on the basis of the obtained false-color reduced color signal C. Since the signal values of the Cb and the Cr signals are suppressed on the basis of the high frequency component and the chroma single extracted and generated as described above, it is possible to reproduce the further natural image, by improving the detection accuracy of the chroma in the subject image, thereby suppressing the false color in the low chroma region and improving the performance of preventing the occurrence of "color omission" in the high chroma region. Further, as the false-color reduced color signal is calculated from the linear sum of the Cb signal and the Cr signal, this effect can be realized with a simple circuit configuration.

It should be noted that, in this embodiment, an example is given in which the image signals represented in the RGB color space and obtained by using the color filter with the primary color Bayer matrix are conveted into the predetermined YCbCr signal. However, the conversion destination, which is the YCbCr color space in this example, varies depending on devices. Therefore, it is desirable that the adjustment coefficient kCb used at the time of obtaining the false-color reduced color signal C is varied based on the conversion expression depending on the color space of the conversion destination. More specifically, the conversion expression from the YCbCr signal to the RGB signal can be expressed as follows:

$$R=Y+kCrR \times Cr+kCbR \times Cb,$$

$$G=Y+kCrG \times Cr+kCbG \times Cb, \text{ and,}$$

$$B=Y+kCrB \times Cr+kCbB \times Cb,$$

where kCrR, kCbR, kCrG, kCbG, kCrB and kCbB are conversion coefficients determined according to the color spaces of the conversion destination.

In this case, the adjustment coefficient kCb set to the integrator 313 can be obtained by the following expression.

$$kCb=(kCbR+kCbB-2 \times kCbG)/(kCrR+kCrB-2 \times kCrG).$$

Therefore, it may be possible to change the adjustment coefficient kCb in accordance with the change of the color space of the conversion destination, by obtaining and memorizing combinations of the color spaces with the adjustment coefficient kCb in advance.

Fourth Embodiment

Figure 11:
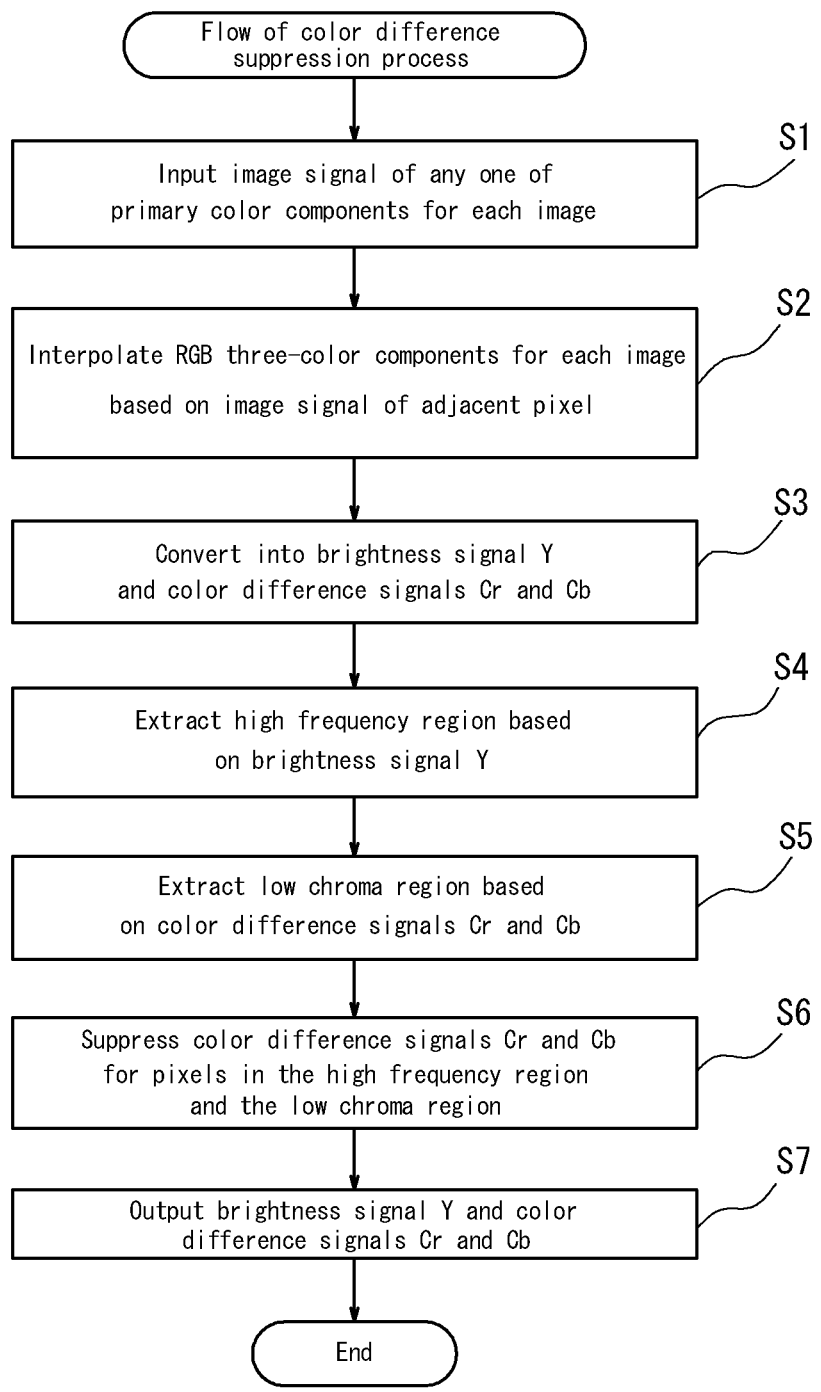
FIG. 11 is a flowchart illustrating a procedure of an image processing implemented by a computer program in an image processing device according the fourth embodiment of the present invention; and, FIG. 12 is a flowchart illustrating an extraction process of a low chroma region.

This embodiment implements image processing through a software program on a computer, which is implemented by the signal processing section using a hardware circuit in the third embodiment. FIG. 11 is a flowchart illustrating a procedure of the image processing made by a computer program. Further, FIG. 12 is a flowchart illustrating details of the process in step S5 in FIG. 11 (extracting the low chroma region on the basis of the color-difference signals Cr and Cb).

As illustrated in FIG. 11, in the processing through the software program, the computer first receives inputs of image signals of any of the primary colors for respective pixels (step S1), interpolates three primary color components of RGB for each of the pixels by using image signals of adjacent pixels (step S2), converts the thus obtained RGB signals into a brightness signal Y and color-difference signals Cb and Cr (step S3), extracts a high frequency region based on the brightness signal Y (step S4), extracts a low chroma region based on the color-difference signals Cb and Cr (step S5), implements a suppress process to the color-difference signals Cb and Cr for the respective pixels located in both of the high frequency region and the low chroma region (step S6), and outputs the brightness signal Y and the color-difference signals Cb and Cr (step S7).

As illustrated in FIG. 12, the low chroma region is extracted in step S5 by: obtaining a false-color reduced color signal C by using the expression of Cr+kCb×Cb (step S51); obtaining an absolute value of C to calculate an absolute value Sat thereof using the expression of Sat=abs(C) (step S52); and implementing a masking process to a region other than the low chroma region on the basis of the calculated chroma signal Sat (step S53).

According to this embodiment, in addition to the effects obtained by the third embodiment, it is possible to configure a smaller and less expensive device by realizing the image processing device with the software.

It should be noted that the present invention is not limited to the embodiments described above, and various modifications and changes are possible. For example, a color filter used for the image capturing element is not limited to the Bayer matrix with three primary colors of RGB. For example, it may be possible to employ combination of other colors or employ a filter having three or more colors.

REFERENCE NUMERALS

1 Optical system
2 Image capturing section
3 Signal processing section
4 Output section
5 Control section
6 Interpolation unit
7, 7' High-frequency component extracting unit
8, 8' False-color reduced signal generation unit
9, 9' Chroma signal generation unit
10, 10' Suppression unit
11 Color-space conversion unit
101 WB circuit
102 Interpolation circuit
104 False color suppression section
105 Edge enhancement processing section
106 3×3 color-difference matrix circuit
107 Buffer
108 Color adjustment circuit
111 Horizontal-vertical-direction HPF
112 Edge-chroma killer setting LUT
114 Adder
115 Integrator
116 Absolute value circuit
117 Chroma killer adjustment circuit
118 False color suppression circuit
121 LPF
122 HPF
123 Edge enhancement circuit
124 Edge adder
200 Microscope
201 Microscope optical system
202 Image capturing section
203 Signal processing section
204 Output section
205 Control section
304 False color suppression section
305 Edge enhancement processing section
306 3×3 color-difference matrix circuit
311 Edge-chroma killer setting LUT
312 Adder
313 Integrator
314 Absolute value circuit
315 Masking circuit
316 Cb integrator
317 Cr integrator
321 LPF
322 HPF
323 Edge enhancement circuit
324 Edge adder

What is claimed is:

1. An image processing device that processes image signals from an image capturing element in which a plurality of types of photoelectric conversion elements each outputting an image signal of any one of a plurality of primary color components are arranged for each pixel in accordance with a predetermined arrangement rule, the image processing device comprising:
   an interpolation unit for implementing an interpolation process to image signals of respective pixels received from the image capturing element by using image signals of adjacent pixels to obtain an image signal of a plurality of primary colors for each of the pixels;
   a high-frequency component extracting unit for extracting a high frequency component contained in the image signals received from the image capturing element;
   a false-color reduced color signal generation unit for obtaining a false-color reduced color signal in which an effect of a false color is reduced, from the image signal of the plurality of primary colors for the respective pixels;
   a chroma signal generation unit for generating a chroma signal for each of the pixels on the basis of a signal value of the false-color reduced color signal; and a suppression unit for suppressing the false color contained in the image signal of the plurality of primary colors for the respective pixels on the basis of the chroma signal and the high frequency component;

wherein the image capturing element is formed such that primary colors R, G and B are arranged in a Bayer matrix; and wherein the false-color reduced color signal generation unit generates a (R+B) component as the false-color reduced color signal.

2. An image processing device that processes image signals from an image capturing element in which a plurality of types of photoelectric conversion elements each outputting an image signal of any one of a plurality of primary color components are arranged for each pixel in accordance with a predetermined arrangement rule, the image processing device comprising:

an interpolation unit for implementing an interpolation process to image signals of respective pixels received from the image capturing element by using image signals of adjacent pixels to obtain an image signal of a plurality of primary colors for each of the pixels;

a color space conversion unit for converting the image signal of the plurality of primary color components obtained by the interpolation unit for the respective pixels into image signals represented in a color space having a brightness component and color components;

a high-frequency component extracting unit for extracting a high frequency component of a signal value of a brightness component for each of the pixels on the basis of a signal value of the brightness component;

a false-color reduced color signal generation unit for obtaining, for each of the pixels, a false-color reduced color signal in which an effect of a false color is reduced, on the basis of the signal value of the color component;

a chroma signal generation unit for generating a chroma signal for each of the pixels on the basis of a signal value of the false-color reduced color signal; and a suppression unit for suppressing the signal value of the color component on the basis of the chroma signal and the high frequency component;

wherein the image capturing element is formed such that primary colors R, G and B are arranged in a Bayer matrix;

wherein the color space having a brightness component and color components is a YCbCr space; and wherein a linear sum of a Cb component and a Cr signal component is generated as the false-color reduced color signal.

3. An image processing device that processes image signals from an image capturing element in which a plurality of pixels are two-dimensionally arranged and each of the plurality of pixels outputs an image signal corresponding to a color component of R, G, B arranged in a Bayer matrix, the image processing device comprising:

an interpolation unit for implementing an interpolation process to image signals of any one of the color components received by the respective pixels from the image capturing element to interpolate image signals of different color components from the received any one of the color components by using image signals of adjacent pixels to obtain an image signal of a color component R, G, B for each of the pixels;

a high-frequency component extracting unit for extracting a high frequency component of the image signal of the G component by using the image signal of the G component contained in the image signals received from the image capturing element;

a false-color reduced color signal generation unit for obtaining a false-color reduced color signal which is a signal calculated by adding an image signal of the R component and an image signal of the B component and subtracting an image signal of the G component whose gain is adjusted for the respective pixels;

a chroma signal generation unit for generating a chroma signal for each of the pixels on the basis of a signal value of the false-color reduced color signal; and a suppression unit for suppressing the false color contained in the image signals of the R component and the B component for the respective pixels on the basis of the chroma signal and the high frequency component.

4. The image processing device according to claim 3, wherein when the suppression unit suppresses the false color contained in the image signals of the R component and the B component for each of the pixels, the suppression unit suppresses so that a suppression amount by the suppressing is larger when the high frequency component is larger, while the suppression amount by the suppressing is smaller in a high chroma region where the chroma signal is larger.

5. An image processing device that processes image signals from an image capturing element in which a plurality of pixels are two-dimensionally arranged and each of the plurality of pixels outputs an image signal corresponding to a color component of R, G, B arranged in a Bayer matrix, the image processing device comprising:

an interpolation unit for implementing an interpolation process to image signals received by the respective pixels received from the image capturing element by using image signals of adjacent pixels;

a color space conversion unit for converting the image signal obtained by the interpolation unit for the respective pixels into image signals represented in a color space having a brightness component and two color difference components;

a high-frequency component extracting unit for extracting a high frequency component of a signal value of a brightness component for each of the pixels on the basis of a signal value of the brightness component;

a false-color reduced color signal generation unit for obtaining, for each of the pixels, a signal corresponding to a false-color reduced color signal, which is a signal calculated by adding an image signal of the R component and an image signal of the B component and subtracting an image signal of the G component whose gain has been adjusted, by using a linear sum of the signal values of the two color difference components;

a chroma signal generation unit for generating a chroma signal for each of the pixels on the basis of a signal value of the false-color reduced color signal; and a suppression unit for suppressing the false color contained in the signal values of the two color difference components for each of the pixels on the basis of the chroma signal and the high frequency component.

6. The image processing device according to claim 5, wherein the suppression unit calculates an adjustment coefficient which sets a coefficient of one of the two color difference components in the linear sum to one, and obtains an added signal by adding a signal obtained by multiplying the calculated adjustment coefficient and the other of the two color difference components and the color difference component of the one of the two color difference components.

7. The image processing device according to claim 5, wherein the interpolation unit receives image signals of a plurality of primary color components for each of the pixels.

8. The image processing device according to claim 5, wherein when the suppression unit suppresses the false color contained in the image signals of the two color difference components for each of the pixels, the suppression unit suppresses so that a suppression amount by the suppressing is larger when the high frequency component is larger, while the suppression amount by the suppressing is smaller in a high chroma region where the chroma signal is larger.

* * * * *